United States Patent [19]

Wiig

[11] 3,913,145

[45] Oct. 14, 1975

[54] CASSETTE TRANSPORT SYSTEM WITH DRIVE REEL LOCKING MEANS

[75] Inventor: Selmer Wiig, Walnut, Calif.

[73] Assignee: Lockheed Electronics Co. Inc., Azusa, Calif.

[22] Filed: Apr. 29, 1974

[21] Appl. No.: 464,759

Related U.S. Application Data

[63] Continuation of Ser. No. 277,654, Aug. 3, 1972, abandoned.

[52] U.S. Cl. ...................... 360/132; 360/96; 242/98

[51] Int. Cl.[2] .................... G11B 23/06; G11B 15/22

[58] Field of Search ........ 360/132, 93, 96; 242/198, 242/186

[56] References Cited

UNITED STATES PATENTS 3,686,470 8/1972 Stahlberg et al. .................. 360/132

3,692,956 9/1972 Northrup .......................... 360/132

*Primary Examiner*—Bernard Konick

*Assistant Examiner*—R. S. Tupper

*Attorney, Agent, or Firm*—Jackson & Jones

[57] ABSTRACT

A high speed tape cassette and transport system for the retrieval and storage of information includes a cassette housing having two reels and capstans for the tape. A movable cassette cover can lock or release the reels and capstans. The transport provides appropriate drive motors and guides for engaging the capstans and reels when the cover releases them. Spring biased locking pins connect the housing and cover. The transport can have either a pivotal or tranversely moving member for engaging the locking pins and releasing the cover. In operation, the reels and capstans are independent of the cassette housing.

15 Claims, 6 Drawing Figures

CASSETTE TRANSPORT SYSTEM WITH DRIVE REEL LOCKING MEANS

This is a continuation of application Ser. No. 277,654, filed Aug. 3, 1972 and now abandoned.

BACKGROUND OF THE INVENTION

1. Field of the Invention

The present invention relates to a tape transport, tape cassette and high speed information retrieval and storage system, and more particularly, to a high density digital cassette and tape transport record and reproduce system.

2. Description of the Prior Art

For a considerable period of time, there has existed a need in digital data systems to provide a compact and efficient system having a high storage capability with a high data transfer rate. In addition, there has existed a need for a relatively low cost cassette for housing magnetic tape as a storage device. Generally, conventional computer transports have resorted to computer reels and rather elaborate transport designs to meet the demands of the computer industry for a mass data storage system.

When cassettes have been utilized in the prior art, they have generally required a rather expensive, precisely aligned tape transport to handle tape speeds in the range of 150 inches per second with tape tensions of 8 ounces. The cassette systems have not been able to handle a high data transfer rate approaching 1.2 megabits per second with an error range as low as one in a million bits.

Prior art tape transports have required the cassettes to become an integral part of the tape transport guidance system. Generally, the tape speeds have been limited to 40 inches per second because the tape friction will melt the plastic cassettes.

In addition, it has been necessary in the prior art to synchronize the capstan drive and reel drive to provide sufficient tape tensioning and tape speed accuracy.

Problems have been further compounded in the prior art whenever there has been an attempt to significantly reduce the size of conventional computer transports while maintaining a high storage capability and permitting remote operation with logic commands.

SUMMARY OF THE INVENTION

The present invention provides a tape transport and cassette design that permits the tape reels and capstans to be precisely aligned and engaged with the drive system upon the installation of the cassette in the tape transport. During operation, the cassette housing is not used in any manner for supporting or guiding the tape.

In the preferred embodiment, the cassette housing is provided with a resiliently biased cover plate which can effectively release both the capstans and the reels in the cassette housing during the operation of the tape. The tape transport is provided with a movable plate and appropriate guide bearings for independently supporting the capstans and the reels while at the same time releasing them from the cassette housing. In an alternative embodiment, the reels and the capstans' axles can be resiliently compressed to release them from the cassette housing and to permit them to be precisely driven by appropriate motors in the tape transport. The reels and capstans are guided by appropriate guides mounted on the tape transport. As a result of this design characteristic of releasing the reels and capstans while still permitting the tape to be precisely aligned and engaged with the drive system, a recording head can be precisely aligned in the appropriate track on the tape by being simply moved traverse to the movement of the tape. The present system is particularly adapted to remote control operation and to accommodate an automatic insertion and storage unit capable of holding a plurality of individual cassettes.

DESCRIPTION OF THE PREFERRED EMBODIMENT

The present invention can be utilized with a number of different high density storage and decoding data systems and is particularly adapted to provide a high storage capability in a relatively small volume.

It has been found that the cassette of the present invention can provide a storage of 384 megabits equivalent to two computer reels utilizing standard 800 BPI format with a tape speed of 150 inches per second. The tape can be multitrack with, for example, 0.029 inches of track spacing on the tape. Generally, 16 tracks on the tape will provide 32 blocks of data, 12 megabits each, in every cassette. The tape capacity can be, for example, 260 feet capable of receiving a data rate of 1.2 megabits per second in either the read or write position with a capability of a packing density of 8,000 bits per inch. The cassette has a high storage capability with a relatively small volume and, in fact, has a capacity that is 17.8 times larger than a computer reel of equivalent size. The corresponding complimentary tape transport is roughly 100 times smaller than the conventional computer transports. When the system operates from a serial data source, it is capable of transferring data at a rate of 1.2 megabits per second in both the record and reproduce modes. The data can be accepted as NRZ and clock, but converted to and reported as biphase to enhance data accuracy. Logic can be provided which allows the system to operate on line as a mass data storage system for a computer.

Numerous record and reproduce systems can be utilized with the present invention; for example, the Norris U.S. Pat. No. 3,518,648 (1970) discloses a high density record and reproduce system which incudes a digital-to-carrier-to-digital conversion particularly adapted to magnetic tape systems of the present type.

The present invention is particularly described with respect to a high speed digital data storage and recovery system utilizing magnetic tape. It should, however, be clear that other forms of elongated material capable of receiving, storing and transmitting information can be utilized in the present invention.

Figure 1:
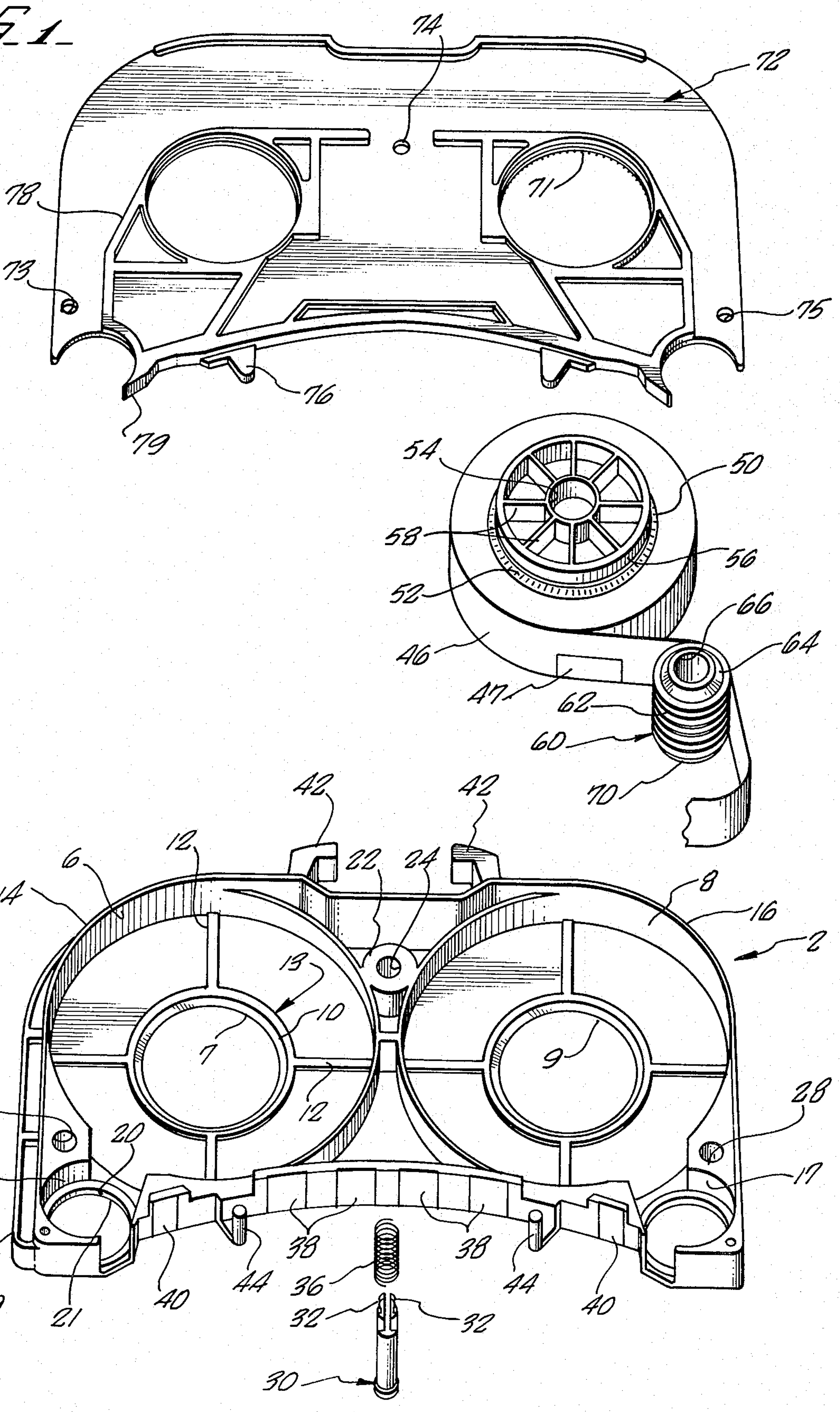
FIG. 1 is an exploded perspective view of one embodiment of the present invention.

Referring to FIG. 1, the tape cassette 2 of the present invention comprises a one-piece housing member 4 that can be conveniently molded from, for example, a thermo-plastic material. The cassette housing 4 having side walls comprises a pair of tape compartments 6 and 8 designed to receive appropriate reels 48 supporting the elongated material or tape 46. FIG. 1 discloses only one reel 48 and guide roller or capstan 60 in compartment 8 and it should be understood that compartment 6 has an identical reel and capstan not shown. Element 60 hereinafter will be identified as a capstan although for the purposes of the present invention it should be understood that this includes its functioning as a guide roller. The lower portion of each tape compartment has a centered bore 9 and 7 respectively with a chamferred bearing surface 10 to assist in aligning the reels 48. Strengthening ribs 12 and an annular lip 13 project from and surround the bores 7 and 9.

Each of the tape compartments 6 and 8 have circular guiding walls 14 and 16 respectively defining the tape compartments. Adjacent each of the tape compartments 6 and 8 are capstan compartments 17 and 18 having a bore 21 centrally located and surrounded by a chamferred bearing surface 20. Adjacent one side of the tape cassette 2 is a guide 19 to facilitate the alignment and storage of the tape in, for example, an automatic storage device (not shown) when the tape is removed from the tape transport 102.

In the body of the tape cassette housing 4, are located three pin bores 24, 26, and 28 to accommodate respectively locking pins 30. Each of the locking pins has a flexible, bifurcated locking head 32. A movable housing plate 72 has appropriate aligned locking bores 73, 74, and 75 to accommodate the bifurcated flexible locking heads 32 of each of the locking pins 30. A spring 36 is mounted on each of the locking pins 30 between the head of the locking pin 30 and the movable cover or housing plate 72.

Appropriate ears or hook members 42 are utilized if the tape cassette 2 is to be part of an automatic storage system where a device will align the tape cassette 2 with a cassette opening 104 of the tape transport 102 and automatically insert and remove the tape cassette 2. Tape retainers 44 are provided on the front surface of the tape cassette 2 for retaining the tape 46 when the cassette is not in use.

Head shields 38 for the read-write heads 130 and 131 of the tape transport 102 are provided on the face of the tape cassette 2. Reflectors 40 are positioned adjacent the capstans 60. The reflectors cooperate with a photo-detector assembly 144 which comprises a light source 146 and a light detector 148 mounted in the cassette opening 104 of the tape transport 102.

The tape 46 can be provided with appropriate openings or holes 47 for permitting the photo-detector assembly 144 to sense the end of the tape, the beginning of the tape, or the center of the tape. This is of particular importance in assiting the logic circuit in emitting the appropriate command signals to select one of the 16 tracks on the tape and command a forward or reverse direction to the tape motion to locate a desired block of data. It is possible to search an entire 12 megabit block at 150 inches per second in only 10 seconds. Generally, the system will utilize the center of the tape position around which the transport normally operates thereby reducing the excess time by allowing search in both directions from the center position.

The tape 46 is mounted on a pair of reels 48 having an upper flange 50 and a lower annular chamferred surface (not shown). The reel flange 50 is provided with radial serrations 52 which are adaptable to cooperate with coacting serrations 71 located on the inside surface of the movable housing plate or cover 72. When the movable housing plate 72 is biased by spring 36 into contact with the flange serrations 52, locking means will be provided which prevent the reel 48 from moving relative to the tape cassette housing 4. This locking means will be removed when the movable housing plate 72 is moved relatively away from the reel 48 to release it for independent suspension and driving by the tape transport 102.

The reels 48 also carry a raised circular guide surface 56 adjacent the flange 50 and a reel guide bore 54 designed to cooperate with the driving mechanism of the tape transport 102. Drive spokes 58 project from the reel guide bore 54 outward to the raised circular guide surface 56 and are adapted to be driven by a pin drive member 122 of the tape transport 102.

The capstans 60 are freely positioned within capstan compartments 18 and can be formed by any sufficiently hard material that is polished or has a smooth finish capable of contacting the tape 46. It has been found that BAKELITE, wich is a hard thermoset plastic, can be utilized or a metal such as aluminum. Air grooves 62 are circumferentially positioned about each of the capstans 60 and actually increase the drive force of the capstan 60 by removing any trapped air that would be dragged along at the high speed of the tape 46. Thus, by actually decreasing the surface area of the capstan 60, it is possible to increase the pressure force exerted upon the tape 46.

Figures 5, 6:
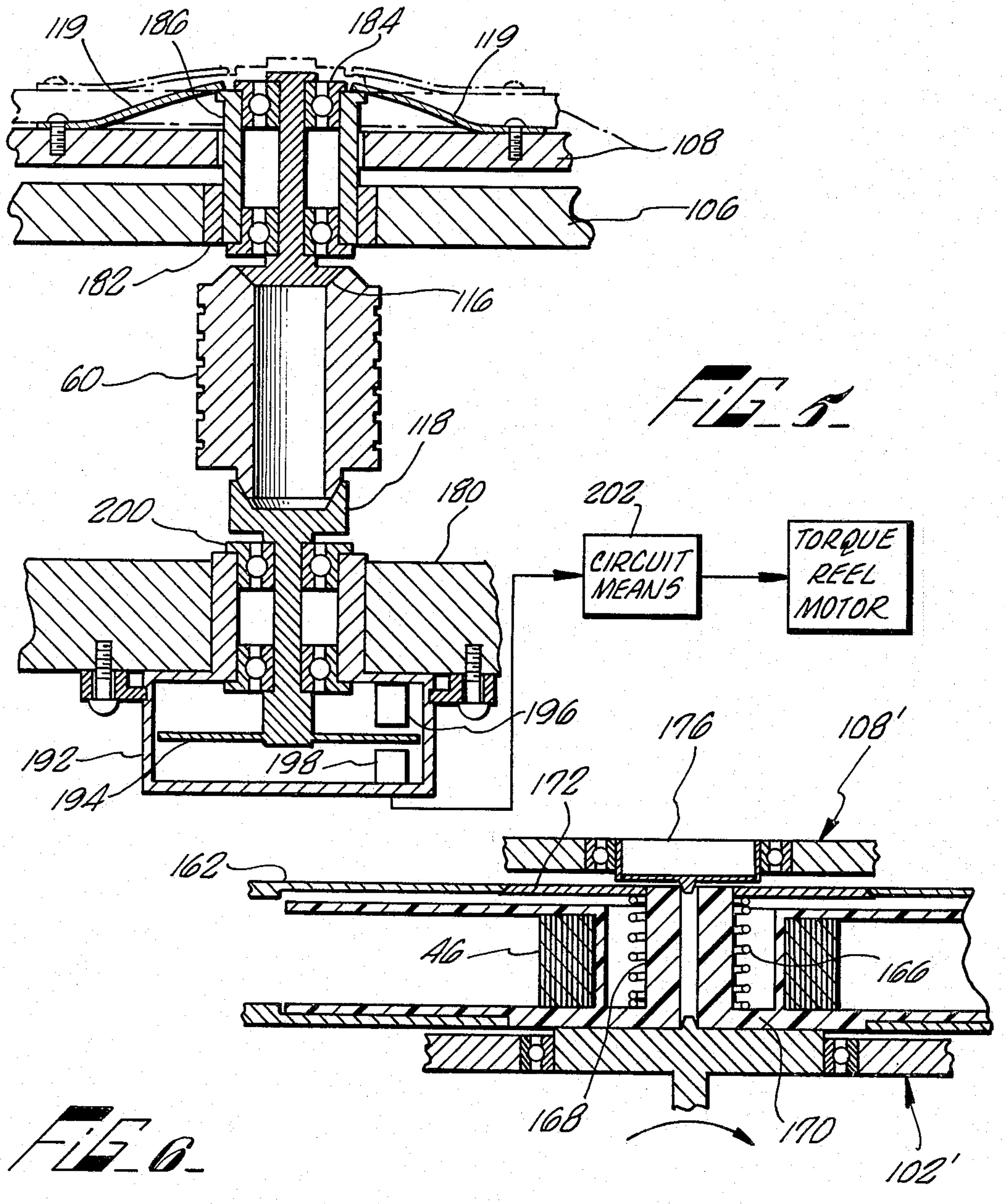
FIG. 5 is a cross sectional view of the capstan drive of the present invention.
FIG. 6 is a cross sectional view of another embodiment of the present invention.

A capstan bore 66 is provided in each capstan to form on one side a female receiving member 70 for a male capstan bearing guide 116 as can be seen in FIG. 5. The other side of the capstans 60 terminate in a male chamferred drive surface 64 for coacting with a corresponding female capstan drive member 118. The angle of the chamferred male drive surface 64 and of the female chamferred drive surface 70 is principally determined as a function of the tape transport drive movement and the availability of movement of the tape transport movable plate 108. It has been found that a 40° angle has proved satisfactory.

Reinforcing ribs 78 are appropriately provided on the outside of the movable housing plate or cover 72 to assist in both the molding and the strengthening of the resultant tape cassette 2. In addition, various holes can be provided in the cassette housing 4 to accommodate conventional molding techniques and to relieve streses as is well known in the molding art.

When fully assembled, the tape cassette 2 will have its movable housing plate or cover 72 resiliently attached to the cassette housing 4 by virtue of the locking pins 30 and the springs 36. The locking pins will be held fast to the movable housing plate or cover 72 through the bifurcated flexible locking heads' 32 engagement with the appropriate locking bores 73, 74, and 75. When the heads of the locking pins are depressed relative to the tape cassette housing 4, for example, when the tape cassette 2 is lodged in the cassette opening 104 of the tape transport 102, the movable housing plate or cover 72 will positively moved away from the capstans 60 and the tape reels 48. This will release the locking means which were engaged as a result of the engagement of the cover serrations 71 with the flange serrations 52 on the reels 48. This will, in effect, separate the reels 48 and the capstans 60 for independent operation from the tape cassette 2. Because of this characteristic, the cassette itself can be produced relatively inexpensive while retaining the precise reeling characteristics necessary for narrow widths and high density recording.

Figure 2:
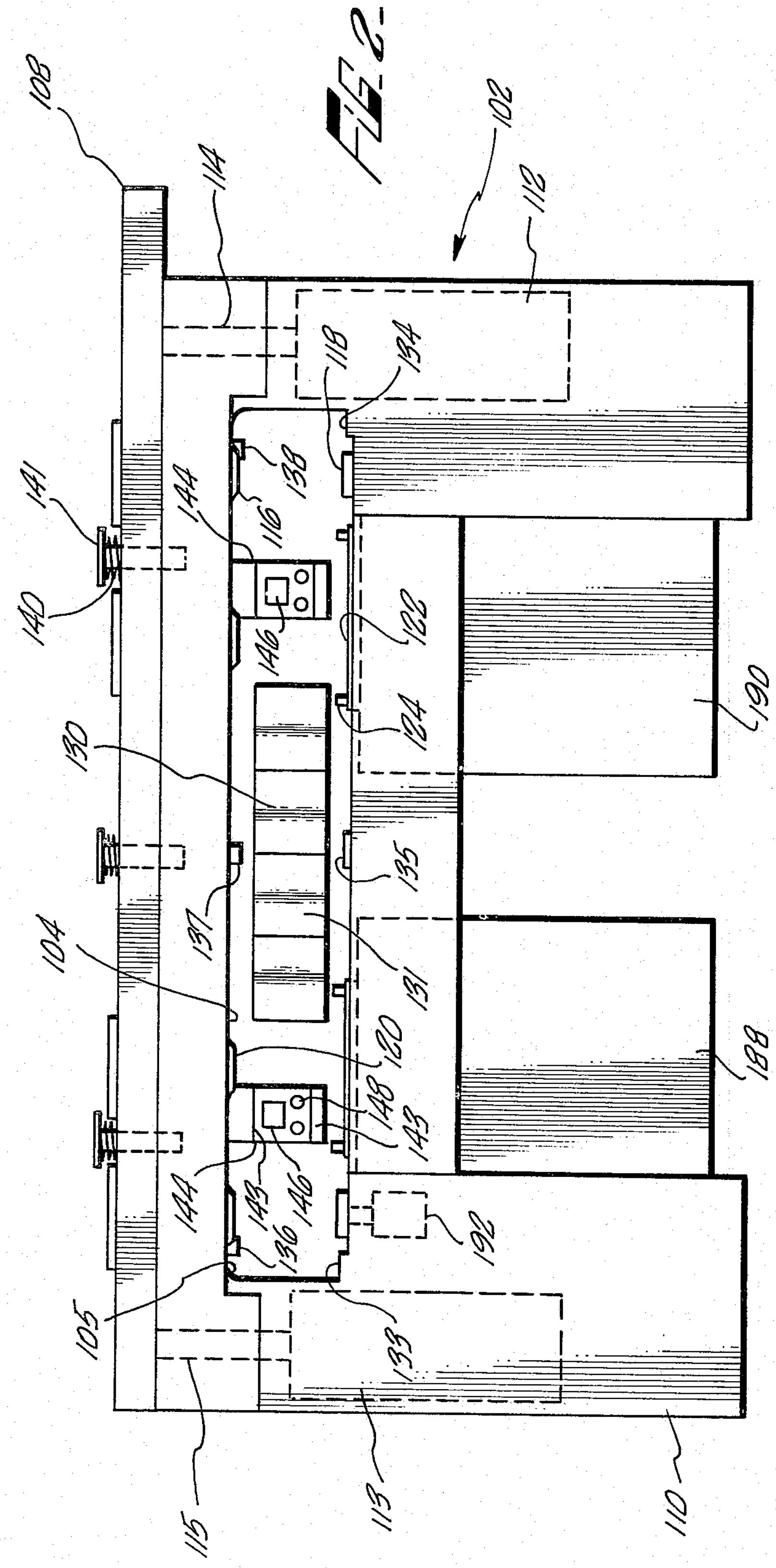
FIG. 2 is a schematical front view of the tape transport of the present invention.

Referring to FIG. 2, a schematic of the tape transport 102 of the present invention is disclosed. The tape transport 102 has a cassette opening 104 with chamferred sides 105 to permit an easy entrance of the tape cassette 2 in either a manual or an automatic fashion. The present tape transport 102 and tape cassette 2 are easily adaptable to an automatic feeder or loader.

The tape transport 102 comprises a base member 110 mounting a stationary plate member 106. Resiliently connected to the stationary plate member 106 is a movable plate 108, see FIG. 3. The movable plate 108 can either be pivotally or traversely movable relative to the stationary plate 106. In the preferred embodiment, the movable plate 108 is moved in a traverse direction by a pair of solenoids 112 and 113 with the movable plate 108 being contacted respectively by the plungers 114 and 115. The solenoids 112 and 113 are mounted on each side of the cassette opening 104. A connecting member 141 is fastened to the stationary plate 106 and extends through appropriate bores in the movable plate 108. Springs 140 are positioned between the connecting member 141 and the movable plate 108 to bias it to a closed position.

Figure 3:
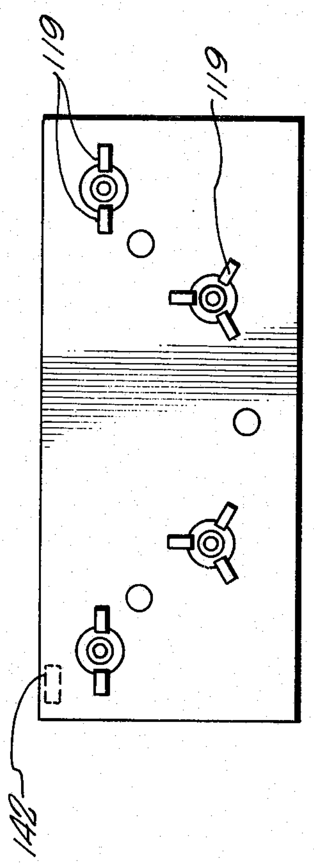
FIG. 3 is a schematical plane view of the tape transport of the present invention.

Referring to FIG. 3, the drive bearing guides for both the capstans 60 and the reels 48 can be seen. The male reel bearing guide 120 and the male capstan bearing guide 116 extend downward into an operative position in the cassette opening 104. These bearing guide members are retained in position by leaf springs 119.

Projecting upward from the base member 110 and located opposite from their appropriate bearing guides are the female capstan drives 118 and the reel pin drive members 122. The reel pin drive members 122 have a pair of spring biased pins 124 projecting upward for engagement with the reel drive spokes 58.

Figure 4:
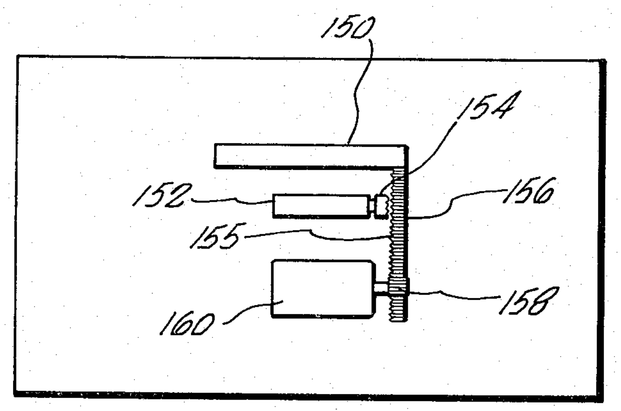
FIG. 4 is a schematical rear view of the tape transport of the present invention.

At the rear of the cassette opening 104, the read-write heads 130 and 131 are independently mounted on a support bar 150 as can be seen in FIG. 4. A head step mechanism 151 can mechanically position the read-write heads 130 and 131 to a precise position opposite the desired track on the tape 46 by appropriate logic commands. This is accomplished by a stepper drive motor 160 which controls a rack 156 connected to the support bar 150 through a pinion 158. A solenoid brake member 152 positions a serrated brake shoe 154 to hold the rack 156 in a precise positive location. The rack 156 is provided with complimentary serrations 155 to receive the brake shoe 154. This arrangement permits a more precise alignment than the use of only the stepper motor 160.

The cassette opening 104 can be provided with appropriate guides such as side cassette guide rails 133 and 134 and a center cassette guide rail 135 for insuring a positive alignment of the tape cassette 2 within the cassette opening 104.

Studs 136, 137 and 138 are provided on the movable plate 108 and are appropriately aligned so that they are capable of contacting the heads of the locking pins 30 of the tape cassette 2 when the tape cassette 2 is operatively positioned in the cassette opening 104. The studs 136, 137, and 138 will force the movable housing plate or cover 72 against the bias of the springs 36 out of engagement with the reels 48 and the capstans 60. Thus, the semi-circular flange members 79 will release the capstans 60 and the plate serrations 71 will disengage from the flange serrations 52 of the reels 48. At this point, the tape 46, reels 48 and capstans 60 are operatively removed from the cassette 2 and actually form an integral part of the tape transport 102.

A microswitch 142 positioned at the rear of the cassette opening 104 and adapted to engage the tape cassette 2 when it is in its operative position will disengage the solenoids 113 and 112 to permit the movable plate 108 to operatively contact the tape cassette 2.

A pair of photo-detector assemblies 144 are operatively positioned within the cassette opening 104 and each comprises a light source 146 and a light detector 148. The light source is aimed against the appropriate reflector 40 on the tape cassette housing 4 and the photo-detector assembly will accordingly be able to determine the position of the tape by virtue of the tape openings 47 to assist in retrieving information during a scanning process.

Tape guides 143 are positioned on the photo-detector assemblies 144 to align the tape 46 both upstream and downstream of the read-write heads 130 and 131. There are no tape guides for moving tape on the tape cassette 2 since it is effectively removed from the tape operation.

Referring to FIG. 6, an alternative embodiment of the present invention is disclosed wherein the capstans and reels of the tape cassette 2 are spring biased to permit their release from the cassette housing 162. To illustrate this modification of the invention, a reel member 164 is shown in FIG. 6 but it should be understood that a similar approach could be used with a capstan. A spring 166 is positioned about the central shaft 168 of a spool member 170. A disk 172 seats the spring 166 against the cassette housing 162.

The tape transport 102' has a lower drive member 174 designed to frictionally drive the spool member 170. The upper movable plate 108' has a bearing member 176 that depresses the disk 172 against the spring 166 to release the reel member 164 from the cassette housing 162. When released, the tape 46 operates completely independent from the cassette housing 162. The upper movable plate 108' moves the reel 164 away from the cassette housing 162 until stopped by the cassette housing 162.

The present invention provides both tape tensioning and tape speed control without the conventional synchronization between the capstan drive and reel drive. Referring to FIG. 5, a cross-sectional view of a capstan speed sensing bearing arrangement is provided. The tape transport 102 needs only two servo controlled reel motors 188 and 190 for the tape operation. Both of the capstans 60 are driven by the tape 46. One of the capstans 60 will be positioned in an upper male bearing guide 116 and a lower female bearing guide 118 to function simply as an idler.

A speed sensing tachometer 192 is attached to the capstan 60 to provide an indication of the tape 46 speed. This is accomplished by connecting through a movable bushing 200 an optical disk 194 that interrupts the light rays from light source 196 to the pick-up transducer 198. The generated signal from the transducer 198 is applied to circuit means 202 which, in turn, controls a reel motor, 188 or 190, depending upon the direction of the tape 46. For example, if the tape 46 is moving in the forward direction, a constant voltage is applied to the reel motor 190 to act as the principal drive for the tape 46. The other reel motor 188 is servo controlled by the tachometer 192 to act as a brake to maintain the tape speed at a constant 150 inches per second. Thus, the first motor 190 will be provided with a constant voltage, from a source not shown, and the second motor 188 will be provided with a variable voltage controlled by the tachometer 192 signal through the circuit means 202 to act as a variable brake thereby maintaining a uniform tape speed. The tape speed will remain constant despite the changes in the effective reel size resulting from the accummulation of tape 46 on the reel. If the tape 46 is to be driven in the reverse direction, the functions of the reel motors 188 and 190 will be reversed.

A movable bushing 200 will be positioned within the transport casting 180 to connect the female drive 118 with the rotatable optic disk 194. An upper movable bushing 186 is held in place by the leaf springs 119 as shown in FIG. 3. Bushing 182 and the stationary plate 106 provide guidance for the movable bushing 186.

By using the speed sensing tachometer 192, tape tensioning and tape speed accuracy are maintained by a simple servo reel motor control which eliminates the synchronization necessary between the capstan drives and reel drives needed in most conventional tape recorders. Thus, the tape transport of the present invention provides a unique method of tensioning and guiding the tape 46.

With the present invention, there is no necessity to use sensor arms as in conventional tape transports to control the tape tension since the speed torque curve of the reel take-up motors are matched through the speed sensing tachometer 192 to the tape diameter and speed. Only one servo unit is required since the reel motor acting as a take-up will have a constant voltage applied. The present invention will provide a fast start-stop capability since acceleration is accomplished by the take-up reel motor and there is no hold back supplied by the other reel motor until the tape 46 reaches the desired speed.

As can be seen, it is possible to utilize a tape transport 102 having only four rotating parts; namely, the idler capstan 60, the tachometer connected capstan 60, and the two reel motors 188 and 190.

It should be noted that various modifications can be made to the apparatus while still remaining within the purview of the following claims.

I claim:

1. A cassette for storing elongated material, such as tape, operable on a transport member having both transport releasable means for releasing the elongated material in the cassette for recoding and retrieval of information and means for moving the elongated material, comprising:

a cassette housing member;

means for supporting the elongated material in the housing including at least one reel for winding the elongated material thereon;

locking means on the housing for contacting the reel to both support the reel, and maintain a fixed relative position of the reel and the elongated material, when the cassette is not operatively mounted on the transport member; and means on the housing, including at least a portion of the housing that is relatively movable away from the reel, for coacting with the transport releasable means, responsive to the cassette being operatively mounted on the transport, both to release the reel to permit movement of the elongated material on the reel for recording and retrieval of information and to remove any support of the reel and the elongated material by the housing.

2. A cassette as in claim 1 further including at least one roller in the housing member for guiding the elongated material and said locking means coacting with the transport releasable means also releases the roller from a stationary position relative to the housing member to permit movement of the elongated material for retrieval and storage of information responsive to the cassette being operatively mounted on the transport member.

3. A cassette as in claim 2 wherein the means for releasing both the reel and the roller relative to the housing member includes a movable cover member mounted on and part of the housing member, the movable cover member engaging the reel and roller during storage to maintain them relatively stationary and releasing them during the retrieval from and storage of information on the elongated material.

4. A cassette as in claim 3 further including means for resiliently biasing the cover member to be recessed position in the housing member to contact and maintain the rollers and reel in an stationary storage position.

5. A cassette as in claim 3 wherein a portion of the reel is serrated and the cover member has cooperating serrated edges for holding the reel to prevent relative movement during storage.

6. A cassette as in claim 3 wherein a second reel and a second roller are positioned in the housing member and are engaged by the movable cover member to prevent relative movement during storage.

7. A cassette as in claim 2 wherein the reel includes at least one flange extending within the cassette housing member and said locking means includes at least a pair of housing side walls and resilient means interconnecting the housing side walls for biasing the side walls towards each other, at least one side wall engaging the flange of the reel and the roller during storage to maintain them relatively stationary and further releasing them responsive to said cassette housing member being operatively mounted on the transport member when at least one of the side walls is relatively moved against the bias of the resilient means.

8. A cassette as in claim 7 wherein the resilient means incudes at least one spring biased positioning pin interconnecting the side walls of the cassette housing.

9. A cassette as in claim 7 wherein the locking means includes a flange on the reel for engaging a portion of the housing member.

10. A high speed information recording, retrieval and storage system comprising:

a cassette housing member;

elongated material capable of receiving, storing and transmitting information;

means for supporting the elongated material in the housing member inclusing at least one reel and at least one roller;

a transport member for receiving the cassette housing member;

means on the transport member for transcribing on and receiving information from the elongated material;

locking means on the cassette housing member including at least a portion of the housing member that maintains the reel and roller in a fixed unmovable position relative to the housing member when the cassette is not operatively mounted on the transport member and is movable away from the reel and roller to release the elongated material when the cassette is operatively mounted on the transport member;

means on the transport member for coacting with the locking means on the housing member responsive to the cassette being operatively mounted to the transport member for moving said portion of the housing member to release the reel and roller from their fixed unmovable position to permit movement of the elongated material;

means on the transport member for engaging and suspending the reel and roller within the housing member and permitting them to be driven independent of any contact with the housing member during the retrieval from and storage of information on the elongated material; and means on the transport member for driving the reel.

11. An information system as in claim 10 wherein the reel has at least one flange extending within the housing member and the locking means includes a movably mounted cassette side wall on the cassette housing to permit relative movement away from the reel flange and roller to permit an independent suspension of the reel and roller for rotation during the retrieval from and storage of information on the elongated material.

12. An information system as in claim 11 wherein the locking means includes a spring biased member attached to the side wall and the means on the transport for coacting with the locking means on the housing further includes a movable member for forcing the spring biased member to move the cassette side wall for releasing the reel and roller.

13. An information system as in claim 10 further including means for maintaining a uniform elongated material speed including a speed sensor means mounted on the transport for generating an elongated material speed signal.

14. An information system as in claim 13 where the means for maintaining a uniform elongated material speed further includes a circuit means for applying the elongated material speed signal to the means for driving the reel to provide a servo braking of the elongated material through the reel.

15. An information system as in claim 14 where the speed sensor means includes an optic disk rotatably connected to the roller, a light source providing a beam of light and an optical tranducer means for receiving the light beam and generating a speed signal, the optical disk positioned in the path of the light beam between the light source and optical transducer means and interrupting the continuity of the light beam in a sequence proportional to the rotation of the roller.

* * * * *